Aug. 2, 1949.  F. D. REEG  2,478,056
COUPLING
Filed May 7, 1945

INVENTOR.
Foster D. Reeg
BY
Earl D. Chappell
ATTORNEYS.

Patented Aug. 2, 1949

2,478,056

UNITED STATES PATENT OFFICE 2,478,056

COUPLING

Foster D. Reeg, Sturgis, Mich., assignor to Kirsch Company, Sturgis, Mich.

Application May 7, 1945, Serial No. 592,465

12 Claims. (Cl. 308—72)

The main objects of this invention are:

First, to provide a coupling which is well adapted for use in control rods and the like and in other relations where a flexible joint is required.

Second, to provide a structure of this type comprising coacting ball and socket bearing members and a hub or support member for the ball member rotatively associated with the ball member.

Third, to provide a structure of this type in which the ball and socket members have 360-degree bearing surface engagement and the ball member and hub member also have 360-degree bearing engagement.

Fourth, to provide a structure having these advantages which can be readily assembled.

Fifth, to provide a coupling of this type in which the parts are economically produced and readily assembled, and one which when assembled is strong and durable and cannot become disassembled in use.

Sixth, to provide a coupling of this type in which the parts may be assembled without the aid of tools or machinery and at the same time are securely retained in assembled relation.

Objects relating to details and economies of the invention will appear from the description to follow. The invention is defined in the claims.

A preferred embodiment of the invention is illustrated in the accompanying drawing, in which.

The embodiment of the invention illustrated comprises a socket member designated generally by the numeral 1 and having an annular head portion 2 with a shank 3 extending therefrom. This head portion 2 has an internal annular bearing 4 of concave section.

Figure 8:
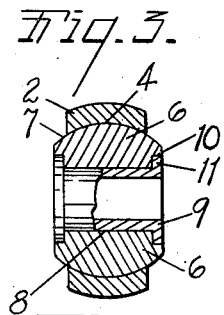
Fig. 8 is a transverse section on line 8—8 of Fig. 2.
Figure 6:
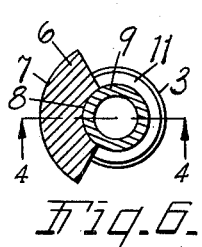
Fig. 6 is a fragmentary section on line 6—6 of Fig. 4 showing the relation of one of the ball bearing segments to the hub or core member.

The ball member designated generally by the numeral 5 comprises a plurality of complementary segments 6, there being three of them in the embodiment illustrated. These bearing segments have peripherally curved bearing surfaces 7 of convex cross section as clearly shown in Fig. 8. These bearing surfaces are substantially wider than the internal bearing or socket member 2 as is also shown in Fig. 8.

The internal bearing 4 of the socket member is spherically curved as is also the outer bearing surfaces of the bearing segments of the ball bearing member. The segments 6 have cylindrically inner curved bearing surfaces 8 which, when the segments are assembled, provide a cylindrical bearing for the sleeve-like hub or core 9 which in the preferred structure is rotatable within or relative to the ball member segments.

The ball members 6 in the embodiment illustrated have recesses 10 at the ends thereof receiving the flanges 11 of the hub or core member 9. In this embodiment this member is tubular to receive a suitable coupling pin, not illustrated. However, it will be understood that the hub or core member might be formed with journals to receive a clevis or coupling yoke. It will be noted that the ball member has a 360-degree bearing surface coaction with the socket member and that the hub member or core and the ball member have a 360-degree coacting bearing engagement. This very materially reduces the amount of friction between the rotating member and the stationary member, and should one of them become frozen or non-rotatable in its bearing surface it is very unlikely that the same condition would arise between the other bearing parts at the same time. In normal use the hub or core rotates in the ball member but should this for any reason become inoperative the ball member will rotate within the socket. The socket and the ball member provide for the universal movement. This also greatly reduces wear and the likelihood of the bearing or coupling becoming inoperative in use.

A further advantage is that if desired the core member may be made of material which does not crush readily under heavy compression loads, and it is frequently necessary to apply quite severe compression to the member to which the clevis is attached. If desired the core or hub may be formed of such material as stainless steel.

Figure 1:
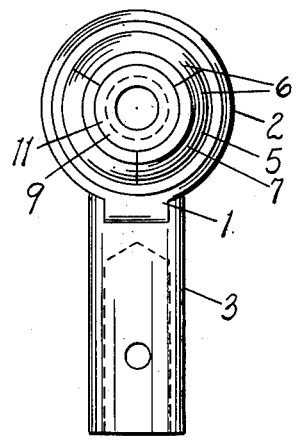
Fig. 1 is a side elevation of a coupling unit embodying the features of the invention with the parts in completely assembled relation.
Figure 2:
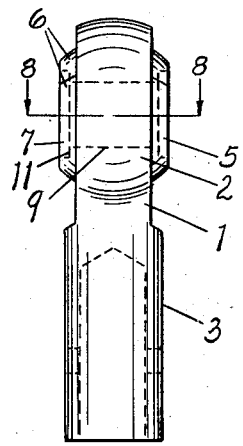
Fig. 2 is an edge elevational view thereof.
Figure 3:
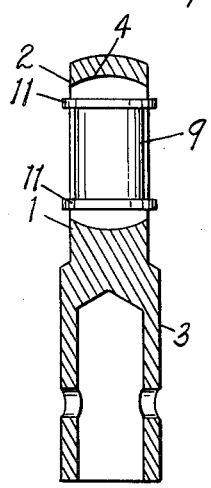
Fig. 3 is a view partially in longitudinal section illustrating one of the steps in assembling.
Figure 4:
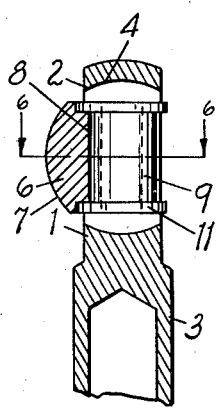
Fig. 4 is a fragmentary view partially in section on line 4—4 of Fig. 6 illustrating a succeeding assembling step.
Figure 5:
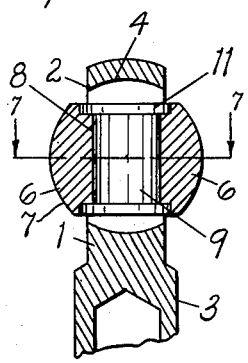
Fig. 5 is a fragmentary view illustrating a still further assembling step, parts being partially in section on line 5—5 of Fig. 7.
Figure 7:
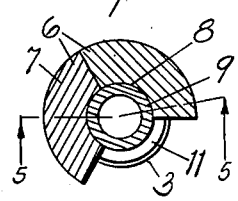
Fig. 7 is a fragmentary section on line 7—7 of Fig. 5 further illustrating the relationship of the ball member segments to the hub or core member.

In the preferred form of assembling, the member 9 is positioned as shown in Fig. 3 radially within the socket member. The ball bearing segments 6 are then successively positioned or placed on the hub and the assembly of the bearing segments 6 and the hub or core member rotated to bring the axis of the hub member axially of the socket bearing as shown in Figs. 1, 2 and 8, which retains these parts in assembled position. The ball bearing segments 6 are of sector shape, that is the segments are bounded by two radially disposed surfaces and an outer bearing surface disposed in the arc of a circle between said radially disposed surfaces. The segments 6 being of sector shape and at least three in number facilitates the assembly of the segments within the socket bearing as shown in Figs. 4 to 8.

If desired, the members 6 may be bonded together as they are assembled on the hub or thereafter sufficiently to retain them in position until the coupling is assembled with its coacting coupling member which prevents lateral rotative movement of the ball member within the socket. This bonding may be accomplished by placing a leaf of solder between the adjacent ends of the sections 6 and passing an electric current through the sections of sufficient capacity to melt the solder or they may be otherwise heated.

It will be further understood that as an alternative method of assembling the member 9 may be formed with a flange at one end, the segments 6 placed within the socket member and the member 9 inserted and the flange upset at the other end. However, the method of assembling illustrated permits the forming of the parts complete so that on the assembling line it is only necessary to position the parts as described without the aid of tools.

It will be noted that continuous bearing surfaces are provided between the ball and socket members and the walls of the socket member are not weakened at any point to facilitate assembling. It will also be seen that the parts may be assembled with 360-degree bearing surface between the hub and ball member.

I have illustrated and described my invention in an adaptation for control rod couplings. I have not attempted to illustrate or describe other adaptations as I believe this disclosure will enable those skilled in the art to embody or adapt the invention as may be desired.

Having thus described my invention what I claim as new and desire to secure by Letters Patent is:

1. In a coupling, the combination of a socket member provided with a shank and having an internal annular bearing of concave cross section, a ball member comprising a plurality of complementary segments and having curved peripheral complemental bearing surfaces of convex cross section disposed in end to end relation within said socket member to provide a substantially continuous peripheral bearing coacting with the internal bearing of said socket member, said ball member segments having inwardly facing recesses constituting complemental bore segments and having complemental segmental recesses in their ends opening to said bore recesses, and a tubular sleeve disposed within said ball member segment bore recesses and having flanges at its ends seated in said end recesses thereof whereby said ball member segments are retained in assembled bearing relation within said socket member, said tubular sleeve and its flanges being insertable within the internal annular bearing with the axis of the sleeve disposed radially of the internal annular bearing to facilitate assembly of the coupling combination.

2. In a coupling, the combination of a socket member provided with a shank and having an internal annular bearing of concave cross section, a ball member comprising a plurality of complementary segments and having curved peripheral complemental bearing surfaces of convex cross section disposed in end to end relation within said socket member to provide a substantially continuous peripheral bearing coacting with the internal bearing of said socket member, and a tubular sleeve disposed within said ball member segments and having flanges at its ends engaging the ends of said ball bearing member segments whereby they are retained in assembled bearing relation within said socket member, said tubular sleeve and its flanges being insertable within the internal annular bearing with the axis of the sleeve disposed radially of the internal annular bearing to facilitate assembly of the coupling combination.

3. In a coupling, the combination of a socket member having an internal annular bearing of concave section, a ball member comprising a plurality of complementary segments having bearing portions of convex section arranged within said socket member in coacting bearing relation with its internal bearing, said ball member segments being internally conformed to constitute segments of a core receiving bore, and a core member arranged within said bore and having end portions engaging the ends of said ball member segments whereby they are retained in assembled relation within the socket member, said core member and its said end portions being of dimensions to permit the same to be disposed within the internal annular bearing, with the axis of the core member disposed radially of the internal annular bearing to facilitate assembly of the coupling combination.

4. In a coupling, the combination with a socket member provided with an internal annular bearing of concave section, of a ball member disposed within said socket member and comprising a plurality of complementary segments having complementary bearing portions providing approximately 360° bearing surface with the internal bearing of said socket member, and a tubular sleeve adapted to receive a coupling pin and having radially offset means in retaining engagement with said ball member segments to confine said segments against endwise movement on said sleeve whereby said ball member segments are retained in assembled coacting bearing relation within said socket member, said segments being of sector shape and at least three in number and said sleeve being insertable in the internal annular bearing with the axis of the sleeve disposed radially of said annular bearing, to facilitate assembly of the coupling combination.

5. In a coupling, the combination with a socket member provided with an internal annular bearing, of a ball member disposed within said socket member and comprising a plurality of complementary segments having complementary bearing portions providing approximately 360° bearing surface with the internal bearing of said socket member, said socket and ball member segment bearings being of concave and convex spherically curved section, and a tubular sleeve adapted to receive a coupling pin and having means in retaining engagement with said ball member segments to confine said segments against endwise movement on said sleeve whereby said ball member segments are retained in assembled coacting bearing relation within said socket member, said segments being of sector shape and at least three in number to facilitate assembly of the same in the coupling combination.

6. In a coupling, the combination with a socket member provided with an internal annular bearing, of a ball member disposed within said socket member and comprising a plurality of complementary segments having complementary bearing portions providing approximately 360° bearing surface with the internal bearing of said socket member, said socket and ball member segment bearings being of concave and convex spherically curved section, and a core end having means in retaining engagement with said ball member segments to confine said segments against endwise movement on said sleeve whereby said ball member segments are retained in assembled coacting bearing relation within said socket member, said segments being of sector shape and at least three in number to facilitate assembly of the same in the coupling combination.

7. In a coupling, the combination with a socket member provided with an internal annular bearing of spherically curved concave section, of a ball member disposed within said socket member and comprising a plurality of complemental bearing segments having complemental peripheral bearing surfaces of spherically curved convex section, and a hub member arranged within said bearing segments and flanged at its ends to retainingly engage the ends thereof, the length of said hub member being less than the internal diameter of said socket member to permit its being positioned radially within said socket member and the assembling of the bearing segments therewith and the assembly rotated to bring the hub member to an axial position with the bearing segments within and in coacting bearing relation to said socket member bearing and retained in assembled relation thereby.

8. In a coupling, the combination with a socket member provided with an internal annular bearing of spherically curved concave section, of a ball member disposed within said socket member and comprising a plurality of complemental bearing segments having complemental peripheral bearing surfaces of spherically curved convex section and providing approximately 360° bearing surface with the internal bearing of the socket member, and a support member arranged within said bearing segments, the length of said support member being less than the internal diameter of said socket member to permit its being positioned radially within said socket member and the assembling of the bearing segments therewith and the assembly rotated to bring the support member to an axial position with the bearing segments within and in coacting bearing relation to said socket member bearing and retained in assembled relation thereby, said segments being of sector shape and at least three in number to facilitate assembly of the same in the coupling combination.

9. In a coupling, the combination with a socket member provided with an internal annular bearing of spherically curved concave section, of a ball member diposed within said socket member and comprising a plurality of complemental bearing segments having complemental peripheral bearing surfaces of spherically curved convex section and providing approximately 360° bearing surface with the internal bearing of the socket member, and a support member arranged within said bearing segments in retaining engagement therewith, said segments being of sector shape and at least three in number to facilitate assembly of the same in the coupling combination.

10. In a coupling, the combination of a socket member provided with an internal annular bearing of concave section, of a ball member disposed within said socket member and comprising a plurality of complementary segments having complementary bearing surfaces providing a substantially 360 degree bearing engagement with said internal annular bearing, said ball member segments having complementary internal bearing surfaces, and an inner bearing member arranged within said ball member to coact with the internal bearing surfaces thereof and rotatable relative thereto whereby said inner member may rotate within said ball member and said ball member may rotate within said socket member, said inner bearing member being insertable within the internal annular bearing with the axis of said inner bearing member disposed diametrically of the internal annular bearing to facilitate assembly of the coupling combination, said inner bearing member having means disposed circumferentially of the bearing surface thereof retainingly engaging the segments to limit movement of the segments endwise of the inner bearing member.

11. In a coupling, the combination with a socket member provided with an internal annular bearing of concave section, of a ball member disposed within said socket member and comprising a plurality of complementary segments having complementary segmental bearings coacting with the internal bearing of said socket member and providing a substantially 360-degree bearing engagement therewith, and a tubular sleeve disposed within said ball member segments and adapted to receive a coupling pin, said ball member segments having complementary internal cylindrical bearing surfaces rotatably coacting with said sleeve, said tubular sleeve being of dimensions to permit the same being disposed within said internal annular bearing, with the axis of the sleeve disposed radially of said internal annular bearing to facilitate assembly of the coupling combination, said tubular sleeve having means disposed circumferentially thereof retainingly engaging said segments to limit movement thereof endwise of the tubular sleeve.

12. In a coupling, the combination with a socket member provided with an internal annular bearing of spherically curved concave section, of a ball member disposed within said socket member and comprising a plurality of complementary bearing segments having complementary peripheral bearing surfaces of spherically curved convex section, and a core member arranged within said bearing segments, the length of said core member being less than the internal diameter of the socket member to permit its being positioned radially within the socket member and the assembling of the bearing segments therewith and the assembly rotated to bring the core member to an axial position with the bearing segments within and in coacting bearing relation to the socket member bearing and retained in assembled relation thereby, said core member having means extending circumferentially thereof and disposed angularly with respect to the axis thereof, said means retainingly engaging said bearing segments against movement axially of the core member.

FOSTER D. REEG.

REFERENCES CITED

The following references are of record in the file of this patent:

UNITED STATES PATENTS

| Number | Name | Date |
|---|---|---|
| 1,020,423 | Hewitt | Mar. 19, 1912 |
| 1,662,595 | Woodward | Mar. 13, 1925 |
| 2,126,388 | Hike | Aug. 9, 1938 |
| 2,260,283 | Halford | Oct. 28, 1941 |

FOREIGN PATENTS

| Number | Country | Date |
|---|---|---|
| 553,067 | Great Britain | May 6, 1943 |